O. LUND.
SECURING ARTIFICIAL TEETH TO BASES.
No. 38,081. Patented Mar. 31, 1863.
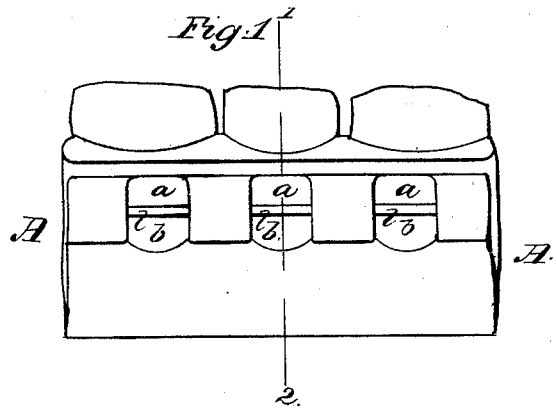
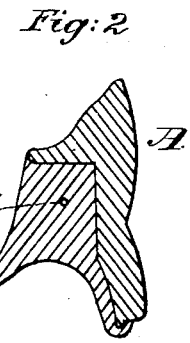
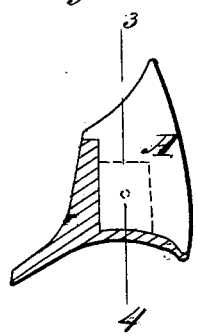
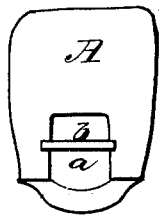
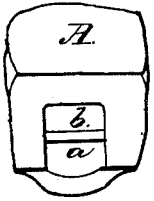
Witnesses:
Chas Howson
W. Albert Steel
Inventor
O. Lund
per Henry Howson
Atty

UNITED STATES PATENT OFFICE.

OLIVER LUND, OF PHILADELPHIA, PENNSYLVANIA, ASSIGNOR TO HIMSELF AND FREDERICK N. JOHNSON, OF SAME PLACE.

IMPROVEMENT IN SECURING ARTIFICIAL TEETH TO BASES.

Specification forming part of Letters Patent No. 38,081, dated March 31, 1863.

*To all whom it may concern:*

Be it known that I, OLIVER LUND, of the city and county of Philadelphia, State of Pennsylvania, have invented a new and useful Improvement in Artificial Teeth; and I do hereby declare the following to be a full, clear, and exact description of the same, reference being had to the accompanying drawings, and to the letters of reference marked thereon.

My invention consists in forming in artificial teeth recesses, with pins arranged across the same and embedded at both ends in the teeth, as described hereinafter, so as to afford a means of firmly securing the teeth to the base or plate by vulcanizable gum or other material applied in a softened or fluid state, and subsequently hardened.

In order to enable others skilled in the art to apply my invention, I will now proceed to describe the manner of carrying it into effect.

On reference to the accompanying drawings, which form a part of this specification, Figure 1 represents the rear of a block of teeth with my improvement; Fig. 2, a section on the line 1 2, Fig. 1; Fig. 3, a view showing my improvement as applied to a single tooth; Fig. 4, a view showing a single tooth secured to the plate or base; and Fig. 5, a section on the line 3 4, Fig. 4.

All the views are drawn to an enlarged scale.

A represents what is technically called a "block," containing, in the present instance, three teeth, and formed of any of the usual materials. The posterior face of the block, opposite each tooth, is cut away or indented, as shown in the drawings, so as to form recesses *a*, across each of which is arranged a platina pin, *b*, the ends of the latter being embedded in the material of which the block of teeth is composed. In a single tooth but one recess is formed, (see Figs. 3 and 5,) the pin *b*, however, being secured in a similar manner to those in the block of teeth.

My invention is intended especially for that class of dental work in which the teeth are secured by vulcanizable gum, or other material capable of being converted from a plastic or fluid state to one of hardness and durability.

It has heretofore been usual to form dovetailed recesses in the blocks, or to attach to the same staples or pins with heads, so that the base, while soft, will enter the recesses or surround the pins or staples, and after hardening hold the blocks firmly to the base. The dovetailed recesses alone have been found barely sufficient to give the base the hold required upon the block, which, in time, works loose. The method of securing the block by means of pins is open to the same objection, a sufficient surface not being presented by the pins to enable the base to retain the block firmly in its place. The platina of which the pins are formed is exceedingly soft, and very often bends within the base and allows the block to drop off. These difficulties are obviated by forming a recess within the block or tooth, and arranging across the same a pin, which, being secured at both ends, prevents the withdrawal of the material constituting the base from the recess. For this purpose the pins may be much less in weight and number than those ordinarily used, for, being secured at both ends, they cannot be so bent as to be readily detached. There is also a great saving in the amount of metal compared with that required for staples, the expense attending the use of which constitutes a great objection, and precludes their employment in many cases.

It will be seen that the peculiar manner in which the pins are arranged within the body of the block or tooth tends to strengthen it, whereas the ordinary mode of placing the pins in the block weakens the same by presenting a point of fracture.

It is obvious that the situation of the pin within the recess is a matter of but little moment, provided it can pass across the recess and through a portion of the material of the base, so that the latter, when in a solid state, cannot be withdrawn from the recess without also removing the pin. It will also be seen that the number and size of the recesses may be increased or diminished and their position varied without departing from the main features of my invention.

I claim as my invention and desire to secure by Letters Patent—

Forming in artificial teeth recesses, with pins arranged across the same and embedded in the material of which the tooth is composed, substantially as and for the purpose herein set forth.

In testimony whereof I have signed my name to this specification in the presence of two subscribing witnesses.

OLIVER LUND.

Witnesses:
HENRY HOWSON,
JOHN WHITE.